Aug. 30, 1949.    C. C. BUCKELS    2,480,805
MOUNTING BRACKET FOR OUTLET OR JUNCTION BOXES
Filed Sept. 29, 1945
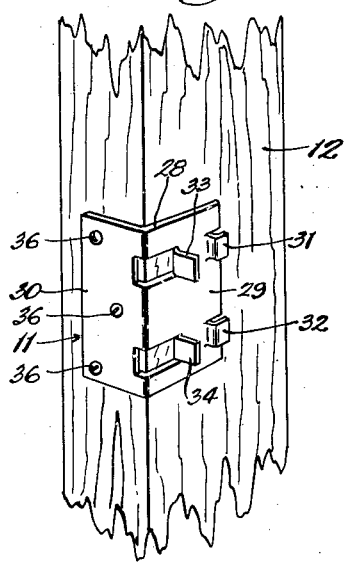
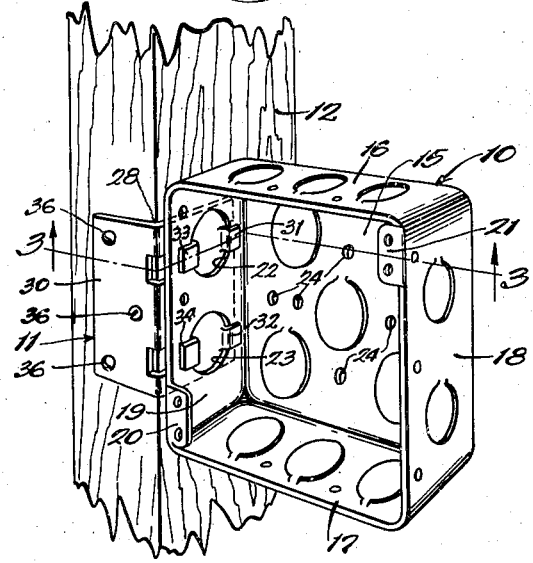
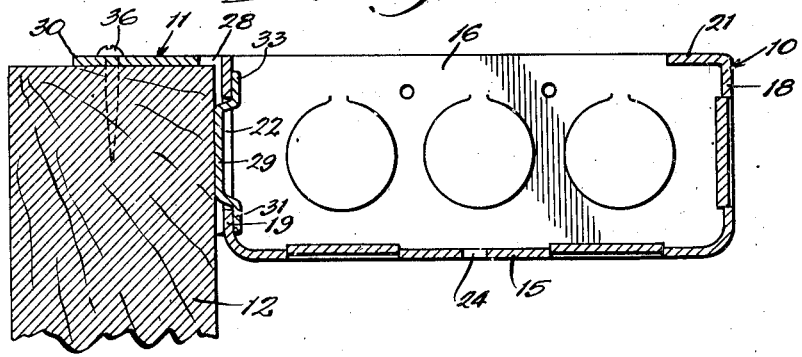
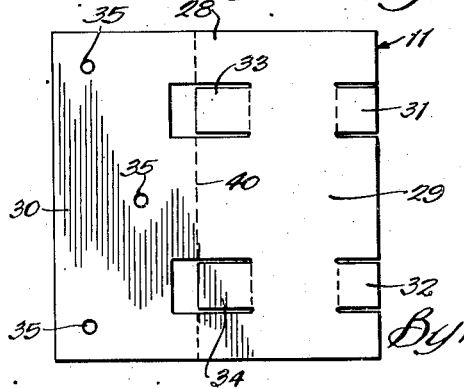
Inventor:
Chris C. Buckels,
By Dawson, Borth and Spangenberg,
Attorneys.

Patented Aug. 30, 1949

2,480,805

UNITED STATES PATENT OFFICE 2,480,805

MOUNTING BRACKET FOR OUTLET OR JUNCTION BOXES

Chris C. Buckels, Chicago, Ill., assignor to Henry Hildebrandt, Chicago, Ill.

Application September 29, 1945, Serial No. 619,284

1 Claim. (Cl. 248—221)

This invention relates to mounting brackets for outlet or junction boxes.

The principal object of this invention is to provide an improved mounting bracket which may be readily applied to conventional outlet or junction boxes for mounting in a simple manner the outlet or junction boxes on a suitable support, such as a supporting stud of a wall. In carrying out this object of the invention the mounting bracket is provided with ears which are adapted to extend through the knock-out holes of a conventional outlet or junction box to secure the latter to the mounting bracket and the mounting bracket also contains provisions for mounting the same on a suitable support. Further objects of this invention reside in the details of construction of the mounting bracket.

Other objects and advantages of this invention will become apparent to those skilled in the art upon reference to the accompanying specification, claims and drawing, in which:

Fig. 1 is a perspective view showing the mounting bracket secured to a stud support;

Fig. 2 is a perspective view similar to Fig. 1 showing the mounting bracket secured to the stud support and the outlet or junction box secured to the mounting bracket;

Fig. 3 is a sectional view taken substantially on the line 3—3 of Fig. 2; and

Fig. 4 is a plan view of the metal blank from which the mounting bracket is made.

The outlet or junction box of conventional form is generally designated at 10 and the mounting bracket of this invention is generally designated at 11. The mounting bracket 11 is secured to a suitable support such as a stud support 12 and the outlet or junction box 10 is carried by the mounting bracket 11.

The outlet or junction box 10 is of conventional form and is provided with a rear wall 15, top and bottom walls 16 and 17, and side walls 18 and 19. The open face of the junction box includes lugs 20 and 21 to which a cover may be secured. The junction box is provided with suitable knock-outs, two of which are designated at 22 and 23 and may also be provided with the usual holes 24.

The mounting bracket 11 comprises the plate 28 which is bent at right angles into two arms 29 and 30. The arm 29 carries ears 31, 32, 33 and 34, which are punched out of the plate 28. The ears 31 and 32 extend away from the arm 29 of the plate 28 and then extend parallel to the arm 29 and the ears 33 and 34 extend out from the arm 29. The other arm 30 of the plate 28 is provided with suitable holes 35 to accommodate screws 36 for attaching the mounting bracket 11 to the stud support 12. Because of the angular relation of the two arms of the mounting bracket, both arms engage the stud support 12 when the bracket is secured thereto by means of screws 36. This provides a rigid mounting construction.

In applying the outlet or junction box 10 to the mounting bracket 11, the knock-outs are removed at knock-out holes 22 and 23 and the knock-out holes 22 and 23 are inserted under the ears 31 and 32. In other words, the ears 31 and 32 hook over the edges of the knock-out holes 22 and 23. At the same time the outwardly extending ears 33 and 34 extend through the knock-out holes 22 and 23 and then they are bent over, as shown in Figs. 2 and 3, to clamp the outlet or junction box to the mounting bracket 11. In this manner the outlet or junction box 10 is easily applied to the mounting bracket 11 without the necessity for utilizing mounting means on the outlet or junction box 10.

Fig. 4 shows the metal blank from which the mounting bracket 11 is made. The blank is punched as shown in Fig. 4, to provide the ears 31, 32, 33 and 34. The ears 31, 32, 33 and 34 are then bent upwardly, as shown in Fig. 1, and the arm 30 is bent downwardly along the dotted line 40, to form the two right angle arms 29 and 30. It is therefore seen that the forming operation of the mounting bracket 11 is very simple.

By reason of this arrangement it is possible to form a simple mounting bracket for attaching a conventional outlet or junction box to a suitable stud support.

I claim as my invention:

A mounting bracket, for mounting on a support an outlet or junction box provided with spaced knock-out holes, comprising, a bracket adapted to be secured to the support, and two pairs of ears formed on the bracket, the ears of each pair being spaced apart to a distance substantially equal to the diameter of the knock-out holes and the pairs of ears being spaced apart to a distance substantially equal to the distance between a pair of adjacent knock-out holes, one ear of each pair extending away from the bracket and then parallel to the bracket to extend through and hook over the edge of the adjacent knock-out holes, and the other ear of each pair extending away from the bracket to extend through the adjacent knock-out holes and adapted to be bent over the edge of the adjacent knock-out holes whereby the outlet or junction box is secured to the mounting bracket.

CHRIS C. BUCKELS.

REFERENCES CITED

The following references are of record in the file of this patent:

UNITED STATES PATENTS

| Number | Name | Date |
|---|---|---|
| 1,509,288 | Fralick | Sept. 23, 1924 |
| 1,718,878 | Raquette | June 25, 1929 |